(12) United States Patent
Kim et al.

(10) Patent No.: US 12,157,348 B2
(45) Date of Patent: Dec. 3, 2024

(54) INJECTION-TYPE HEAT EXCHANGE MODULE AND VEHICLE THERMAL MANAGEMENT SYSTEM USING SAME

(71) Applicants: HYUNDAI MOTOR COMPANY, Seoul (KR); KIA CORPORATION, Seoul (KR)

(72) Inventors: Jong Won Kim, Cheonan-si (KR); Sang Shin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 160 days.

(21) Appl. No.: 17/946,266

(22) Filed: Sep. 16, 2022

(65) Prior Publication Data
US 2023/0182540 A1 Jun. 15, 2023

(30) Foreign Application Priority Data
Dec. 15, 2021 (KR) .......................... 10-2021-0179798

(51) Int. Cl.
*B60H 1/32* (2006.01)
*B60H 1/00* (2006.01)
(52) U.S. Cl.
CPC ....... *B60H 1/3227* (2013.01); *B60H 1/00571* (2013.01); *B60H 1/00899* (2013.01); *B60H 2001/00942* (2013.01)

(58) Field of Classification Search
CPC ...... F25B 2600/2501; F25B 2600/2507; F25B 41/20; F25B 41/42; F25B 2400/13; F25B 40/00
See application file for complete search history.

(56) References Cited

U.S. PATENT DOCUMENTS

| | | |
|---|---|---|
| 5,692,394 A | 12/1997 | Ozaki et al. |
| 5,799,499 A | 9/1998 | Yano et al. |
| 6,298,687 B1 | 10/2001 | Dienhart et al. |
| 2017/0284715 A1 | 10/2017 | Mukherjee |
| 2019/0070924 A1 | 3/2019 | Mancini et al. |
| 2019/0299126 A1* | 10/2019 | Osaki ...................... B01D 1/28 |

* cited by examiner

*Primary Examiner* — Lionel Nouketcha
(74) *Attorney, Agent, or Firm* — MCDONNELL BOEHNEN HULBERT & BERGHOFF LLP

(57) ABSTRACT

An injection-type heat exchange module includes an outer tank configured with upper and lower chambers, the upper chamber being connected in such a manner that refrigerant is introduced thereinto from an outer condenser or an inner condenser, and the lower chamber being connected in such a manner that the refrigerant is introduced thereinto from an evaporator and that the refrigerant is discharged therefrom to a compressor, an inner tank arranged inside the outer tank and connected in such a manner that the refrigerant is discharged therefrom to the compressor or the evaporator; a first valve arranged in an upper end portion of the inner tank, a second valve arranged in a lower end portion thereof, and an actuator connected to both the first valve and the second valve and operating in such a manner that the first and second valves are rotated at the same time.

12 Claims, 10 Drawing Sheets

FIG. 3

| Control Mode | Case | Upper End Portion | | Lower End Portion | |
|---|---|---|---|---|---|
| | | EXV1(Gas inj) | Bypass | EXV2 | Bypass |
| Gas injection | 1 | ○ | × | ○ | × |
| A/C expansion | 2 | × | × | ○ | × |
| All Bypass | 3 | × | ○ | × | ○ |
| Bypass | 4 | × | ○ | × | × |
| All close | 5 | × | × | × | × |

INJECTION-TYPE HEAT EXCHANGE MODULE AND VEHICLE THERMAL MANAGEMENT SYSTEM USING SAME

CROSS REFERENCE TO RELATED APPLICATIONS

The present application claims priority to Korean Patent Application No. 10-2021-0179798, filed Dec. 15, 2021, the entire contents of which is incorporated herein for all purposes by this reference.

BACKGROUND

Field

The present disclosure relates to an injection-type heat exchange module and a vehicle thermal management system using the injection-type heat exchange module. More particularly, the present disclosure relates to a technology for a vehicle thermal management system capable of utilizing a heat exchange module for heat exchange between circulating refrigerants and using energy consumed in a compressor during heating. With this vehicle thermal management system, an amount of separate heater usage can be reduced at an initial heating stage.

Description of the Related Art

An increasing demand for environment-friendly vehicles, such as electric vehicles, has been trend in recent years due to environmental issues with existing internal combustion engine-equipped vehicles. For the existing internal combustion engine-equipped vehicles, there is no need for energy for separate heating because air heated by waste heat of an engine is circulated into an occupant space in the vehicle. In contrast, for electric vehicles, there is a need for energy for separate heating because a heat source, such as an engine, is not available. For this reason, the fuel efficiency is decreased. Furthermore, a decrease in the distance the electric vehicle travels causes the inconvenience of having to frequently charge a vehicle battery.

Vehicle motorization has additionally created the need for heat management of a high-voltage battery and electric components, such as a motor, as well as a vehicle occupant space. That is, in the case of the electric vehicles, the vehicle occupant space, the battery, and the electric components have different air-conditioning needs. Therefore, there is a need for a technology for maximally saving energy through efficient cooperation among the vehicle occupant space, the battery, and the electric components while individually meeting such needs. Accordingly, the concept of integrated thermal management has been proposed in order to increase the thermal efficiency by integrating overall vehicle thermal management, as well as individually performing thermal management of the vehicle occupant space, the battery, and the electric components.

In order to perform this vehicle integrated thermal management, there is a need for integrating complex coolant lines and components into modules. Furthermore, in addition to the integration of the components into modules, simplification and compactness are required in terms of manufacturing and packaging the modules.

In recent years, research has actively been conducted on increasing the efficiency of a heat pump in the electric vehicle. One of high-efficiency heat pumps is a gas injection-type heat pump.

In the gas injection-type heat pump, the use of a heat exchanger (H/X) and an accumulator increases an amount of refrigerant circulating during heating and thus increases the heating efficiency of the vehicle.

However, the gas injection-type heat pump in the related art requires separate mounting of a heat exchanger and an accumulator and individual controlling of a plurality of expansion valves.

The foregoing is intended merely to aid in understanding the background of the present disclosure and therefore should not be interpreted to admit that the present disclosure falls within the purview of the related art that is already known to a person of ordinary skill in the art.

SUMMARY

The objective of the present disclosure is to provide a technology for performing gas injection in a refrigeration cycle using a heat exchange module into which a heat exchanger and a flash tank are integrated.

According to an aspect of the present disclosure, there is provided an injection-type heat exchange module including an outer tank configured with an upper chamber and a lower chamber that are separated from each other, the upper chamber being connected in such a manner that refrigerant is introduced thereinto from an outer condenser or an inner condenser, and the lower chamber being connected in such a manner that the refrigerant is introduced thereinto from an evaporator and being connected in such a manner that the refrigerant is discharged therefrom to a compressor; an inner tank arranged inside the outer tank in such a manner that heat exchange with the refrigerant inside the outer tank possibly takes place and connected in such a manner that the refrigerant is discharged therefrom to the compressor or the evaporator, a first valve arranged in an upper end portion of the inner tank, rotation of the first valve expanding the refrigerant in an upper portion of the outer tank into the inner tank, causing the refrigerant in the upper portion thereof to flow into the inner tank, or blocking the flowing of the refrigerant in the upper portion thereof into the inner tank, a second valve arranged in a lower end portion of the inner tank, rotation of the second valve expanding the refrigerant inside the inner tank into the evaporator, causing the refrigerant inside the inner tank to flow into the evaporator, or blocking the flowing of the refrigerant inside the inner tank into the evaporator, and an actuator connected to both the first valve and the second valve and operating in such a manner that the first valve and the second valve are rotated at the same time.

In the injection-type heat exchange module, the inner tank may be arranged in such a manner that heat exchange with refrigerants in the upper chamber and the lower chamber possibly takes place at the same time.

In the injection-type heat exchange module, the inner tank may be formed to have a structure in which one portion of an external surface thereof or an entire external surface thereof has an enlarged surface area.

In the injection-type heat exchange module, the inner tank may be connected at an upper portion thereof to the compressor in such a manner that the refrigerant in gas phase is discharged to the compressor, and may be connected at a lower portion thereof to the evaporator in such a manner that the refrigerant in liquid phase is discharged to the evaporator.

In injection-type heat exchange module, the lower chamber of the outer tank may be connected at an upper portion thereof to the compressor in such a manner that the refrigerant in gas phase is discharged to the compressor.

In the injection-type heat exchange module, a rotational expansion hole or a rotational flowing hole may be formed in each of the first valve and the second valve, a stationary expansion hole or a stationary flowing hole may be formed in each of the upper end portion and the lower end portion of the inner tank, and relative rotation of the first valve and the second valve to the inner tank may change a relative position between a rotational expansion hole or a rotational flowing hole and a stationary expansion hole or a stationary flowing hole.

In the injection-type heat exchange module, the rotational expansion hole in the second valve may communicate with the stationary expansion hole in the lower end portion of the inner tank at a position where the rotational expansion hole in the first valve communicates with the stationary expansion hole in the upper end portion of the inner tank.

In the injection-type heat exchange module, the rotational expansion hole and the rotational flowing hole in the first valve may be closed at a position where the rotational expansion hole in the second valve communicates with the stationary expansion hole in the lower end portion of the inner tank.

In the injection-type heat exchange module, the rotational flowing hole in the second valve may communicate with the stationary flowing hole in the lower end portion of the inner tank at a position where the rotational flowing hole in the first valve communicates with the stationary flowing hole in the upper end portion of the inner tank.

In the injection-type heat exchange module, the rotational expansion hole or the rotational flowing hole in the second valve may be closed at a position where the rotational flowing hole in the first valve communicates with the stationary flowing hole in the upper end portion of the inner tank.

According to another aspect of the present disclosure, there is provided a vehicle thermal management system using the injection-type heat exchange module, a first refrigerant line along which refrigerant flows from lower end portions of an inner tank and an outer tank through a compressor to an inner condenser; a second refrigerant line branching off from the inner tank to an evaporator and an outer condenser, the refrigerant flowing along the second refrigerant line; a third refrigerant line along which the refrigerant flows from a chiller or the evaporator to a lower chamber of the outer tank; and a fourth refrigerant line along which the refrigerant flows from the outer condenser and the inner condenser to an upper chamber of the outer tank.

The vehicle thermal management system may further include a controller configured to control operation of the compressor and to control rotation of the actuator in such a manner that the first valve and the second valve expand the refrigerant, causes the refrigerant to flow, or block the flowing of the refrigerant.

The injection-type heat exchange module according to the present disclosure is a module into which a heat exchanger and a flash tank are integrated. Particularly, the injection-type heat exchange module includes the valves that operate by one actuator for adjusting the expanding or flowing of the refrigerant. Accordingly, the effect of simplifying a configuration of the system and improving the efficiency thereof can be achieved.

BRIEF DESCRIPTION OF THE FIGURES

The above and other objectives, features, and other advantages of the present disclosure will be more clearly understood from the following detailed description when taken in conjunction with the accompanying drawings, in which:

FIG. 3 is a table illustrating open states of a first valve and a second valve according to various control modes of the injection-type heat exchange module according to the embodiment of the present disclosure;

DETAILED DESCRIPTION

Figure 1:
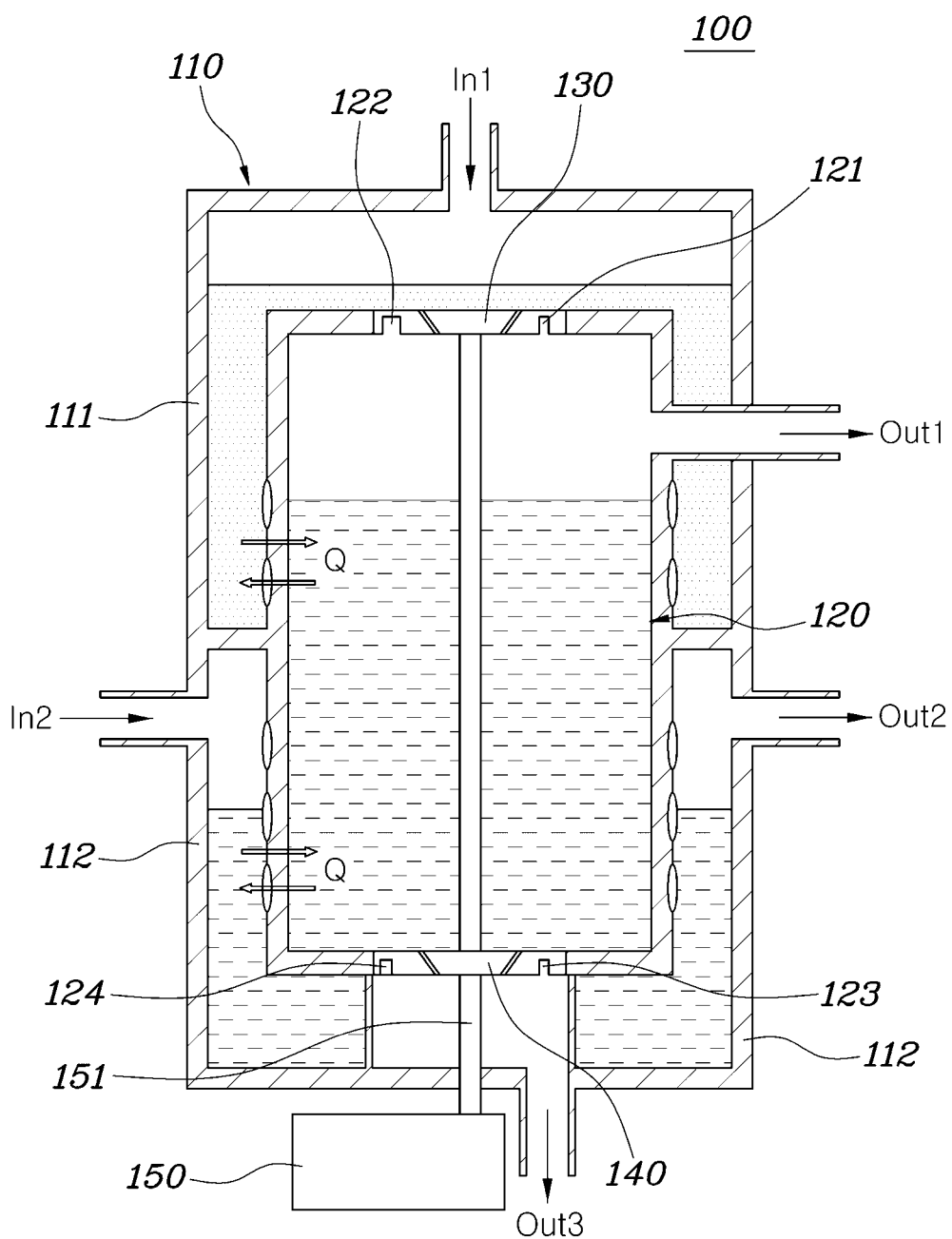
FIG. 1 is a view illustrating a configuration of an injection-type heat exchange module according to an embodiment of the present disclosure.

Embodiments of the present disclosure will be described in terms of specific structures and functions to enable a person of ordinary skill in the art to comprehend the present disclosure. The embodiments of the present disclosure may be practiced in various ways, and the present disclosure should not be construed as being limited thereto.

Various modifications may be made in various ways to the embodiments of the present disclosure. Therefore, specific embodiments will be described in detail below with reference to the accompanying drawings. However, such specific embodiments are not intended to impose any limitation on the technical idea of the present disclosure. All alterations, equivalents, and substitutes that are included within the technical idea of the present disclosure should be understood as falling within the scope of the present disclosure.

The terms first, second, and so on may be used to describe various constituent elements but should not limit the meanings of these constituent elements. These terms are only used to distinguish one constituent element from another. For example, a first constituent element may be termed a second constituent element without departing from the scope of the present disclosure. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between. The same is true for terms referring to a relationship between constituent elements. For example, the terms "between" and "directly between" and the terms "adjacent to" and "directly adjacent to" should also be construed in the same manner.

The terms used throughout the present specification are only for describing a specific embodiment and are not intended to impose any limitation on the present disclosure. A noun in singular form has the same meaning as when used in plural form, unless it has a different meaning in context. It should be understood that, throughout the present specification, the terms "include", "have", and the like are intended to indicate that a feature, a number, a step, an operation, a constituent element, a component, or a combination thereof is present, without precluding the possibility that one or more other features, numbers, steps, operations, constituent elements, or a combination thereof will be present or added.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that used in the relevant field of technology and, unless otherwise explicitly defined in the present specification, should not be construed as having an excessively implied meaning or a purely literal meaning.

An exemplary embodiment of the present disclosure will be described in detail below with reference to the accompanying drawings. The same reference numerals on the drawings refer to the same constituent element.

Research has been actively conducted on application of an ejector or injection in order to enhance compression and expansion performance in a refrigeration cycle.

In the refrigeration cycle in which the ejector in the related art is used, a structure is employed where a refrigeration condensed in a condenser is caused to flow to a gas-liquid separator by performing a compression recovery function through utilization of the Venturi effect of the ejector and where the refrigerator in liquid phase circulates through an expansion valve and an evaporator. Accordingly, a motive power used (work) in a compressor is decreased. Thus, the effect of increasing a larger amount of flowing refrigerant than in a general refrigeration cycle can be achieved.

However, a problem with the refrigeration cycle in the ejector in the related art is used is that an additional amount of flowing refrigerant is difficult to secure in a low-temperature state.

The injection that is performed in the refrigeration cycle is categorized into gas injection and liquid injection.

In the refrigeration cycle in which the gas injection is performed, a refrigerant is caused to flow to the evaporator through a two-step expansion process, and a primarily expanded refrigerant in gas phase at an intermediate pressure is injected into a compressor. Accordingly, the amount of refrigerant flowing to an outer condenser or an inner condenser, the compressor, and the like is increased, and a compression effect is improved due to two-step compression. Thus, the effect of decreasing the motive power for use in the compressor. Particularly, in cold and tropical regions, the compression and expansion performance in the refrigeration cycle can be prevented from being degraded.

In contrast, in the refrigeration cycle in which the liquid injection is performed, overheating of the compressor is prevented, and, at the same time, an amount of heat used in the compressor is absorbed. Thus, the effect of additionally increasing the amount of flowing refrigeration can be achieved.

Specifically, in the case of a heat exchanger type, on the downstream side of the outer condenser or the inner condenser, a portion of the refrigerant that results from separation is caused to undergo heat exchange with the primarily expanded refrigerant at an intermediate pressure. Accordingly, the portion of the refrigerant that results from separation is vaporized, and, at the same time, quality of the refrigerant that is secondarily expanded and is introduced into the evaporator is decreased.

In addition, in the case of the gas-liquid separator type, on the downstream side of the outer condenser or the inner condenser, the entire refrigerant is expanded, and then is separated into refrigerant in gas phase and refrigerant in liquid phase. The refrigerant in gas phase and the refrigerant in liquid phase are caused to flow to the compressor and a secondary expansion valve, respectively. Accordingly, the refrigerant in liquid that results from separation is secondarily expanded, and thus, the quality of the refrigerant that is introduced into the evaporator is decreased.

Figure 2:
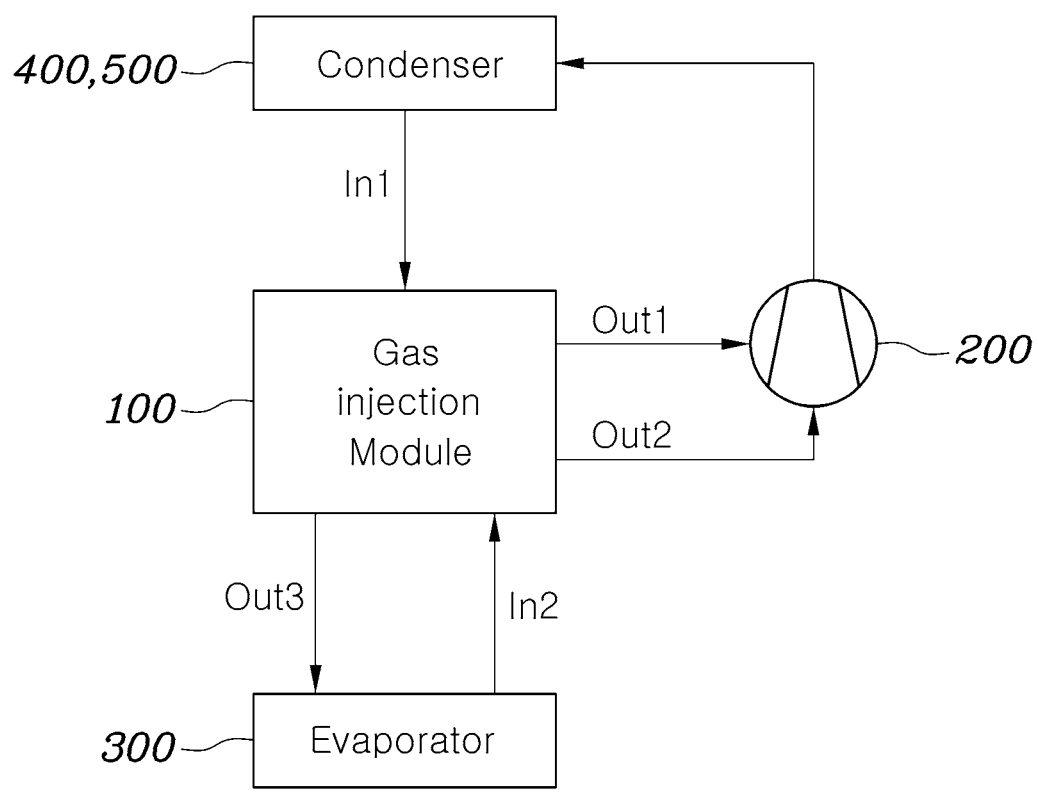
FIG. 2 is a circuit diagram illustrating a thermal management system that uses the injection-type heat exchange module according to an embodiment of the present disclosure.

FIG. 1 is a view illustrating a configuration of an injection-type heat exchange module 100 according to an embodiment of the present disclosure. FIG. 2 is a circuit diagram illustrating a thermal management system that uses the injection-type heat exchange module 100 according to an embodiment of the present disclosure.

With reference to FIGS. 1 and 2, the injection-type heat exchange module 100 includes an outer tank 110, an inner tank 120, a first valve 130, a second valve 140, and an actuator 150. The outer tank 110 is configured with an upper chamber 111 and a lower chamber 112 that are separated from each other. The upper chamber 111 is connected in such a manner that refrigerant is introduced thereinto from an outer condenser 500 or an inner condenser 400. The lower chamber 112 is connected in such a manner that the refrigerant is introduced thereinto from an evaporator 300 and is connected in such a manner that the refrigerant is discharged therefrom to a compressor 200. The inner tank 120 is arranged inside the outer tank 110 in such a manner that heat exchange with the refrigerant inside the outer tank 110 possibly takes place and is connected in such a manner that the refrigerant is discharged therefrom to the compressor 200 or the evaporator 300. The first valve 130 is arranged in an upper end portion of the inner tank 120 and rotation of the first valve 130 expands the refrigerant in an upper portion of the outer tank 110 into the inner tank 120, causes the refrigerant in the upper portion thereof to flow into the inner tank 120, or blocks the flowing of the refrigerant in the upper portion thereof into the inner tank 120. The second valve 140 is arranged in a lower end portion of the inner tank 120 and rotation of the second valve 140 expands the refrigerant inside the inner tank 120 into the evaporator 300, causes the refrigerant inside the inner tank 120 to flow into the evaporator 300, or blocks the flowing of the refrigerant inside the inner tank 120 into the evaporator 300. The actuator 150 are connected to both the first valve 130 and the second valve 140 and operates in such a manner that the first valve 130 and the second valve 140 are rotated at the same time.

Specifically, the injection-type heat exchange module 100 according to the embodiment of the present disclosure may be a module into which a flash tank or accumulator that re-expands the primarily expanded refrigerant and separates the re-expanded refrigerant into the refrigerant in gas phase and the refrigerant in liquid phase, a heat exchanger (H/X), and an expansion valve (EXV) are integrated. Particularly, for operation, three expansion valves may be adjusted by one actuator 150.

The injection-type heat exchange module 100, as described below, is controlled under a gas injection mode, and thus an amount of circulating refrigerant during heating is increased, thereby increasing the heating efficiency of a vehicle. Accordingly, the efficiency of a heat pump can be increased. In addition, the heating and cooling efficiency of the vehicle can be increased through heat exchange between refrigerants inside the injection-type heat exchange module 100.

The outer tank 110 may be formed in such a manner that the upper chamber 111 and the lower chamber 112 thereof are separated. Particularly, the refrigerant is introduced from the outer condenser 500 or the inner condenser 400 into the upper chamber 111 of the outer tank 110. The refrigerant inside the upper chamber 111 may be discharged into the inner tank 120 through the first valve 130.

The inner tank 120 is arranged in such a manner that the heat exchange with the refrigerant inside the outer tank 110 possibly takes place inside the outer tank 110. Particularly, the inner tank 120 may be positioned inside the outer tank 110 in such a manner as to extend over both the upper chamber 111 and the lower chamber 112 of the outer tank 110. The inner tank 120 may be arranged in such a manner that the heat exchange with the refrigerant inside the upper chamber 111 of the outer tank 110 and the heat exchange with the refrigerant inside the lower chamber 112 thereof possibly take place at the same time. The inner tank 120 may be manufactured of a high-thermal conductivity material, for example, copper, aluminum, an alloy thereof, or the like. Particularly, the heat exchange can take place in such a manner that heat of the refrigerant discharged from the upper chamber 111 of the outer tank 110 is absorbed by the refrigerant discharged to the inner tank 120 through the first valve 130 and that, at the same time, heat of the refrigerant inside the lower chamber 112 of the outer tank 110 is absorbed by the refrigerant discharged to the inner tank 120.

The refrigerant may be introduced into the inner tank 120 from the upper chamber 111 of the outer tank 110 through the first valve 130. The refrigerant inside the inner tank 120 can be discharged to the compressor 200 or can be discharged to the evaporator 300 through the second valve 140.

The compressor 200 is a component that compresses a refrigerant absorbed and thus converts the resulting refrigerant into a high-pressure refrigerant. As the compressor 200, a gas injection-type compressor 200 for two-step compression is used. In the gas injection-type compressor 200 for two-step compression, in order to mix refrigerants, an injection port through which a refrigerant in gas phase at an intermediate pressure is formed in a compression middle portion thereof, separately from an inlet portion through which a refrigerant is introduced.

The inner condenser 400 is a component which is mounted in an inner air-conditioning apparatus for the vehicle to provide heated air to inside the vehicle for heating. To this end, the heat exchange takes place between a compressed refrigerant passing through the inner condenser 400 and air supplied to inside the vehicle. Thus, heat of the refrigerant is dissipated to the air supplied to inside the vehicle.

The first valve 130 and the second valve 140 are components that are open and closed to allow and disallow the flowing of the refrigerant, respectively. The degrees of opening to which the first valve 130 and the second valve 140 are open are adjusted in such a manner that the refrigerant flows (passes through for bypass) without hindrance or that the refrigerant is expanded.

The evaporator 300 is a component in which the heat exchange takes place between the refrigerant and air recirculating to a vehicle occupant space. The evaporator 300 serves to absorb heat of the air recirculating to the vehicle occupant space, thereby increasing the temperature of the refrigerant.

The first valve 130 is arranged in the upper end portion of the inner tank 120 and, particularly, may be positioned between the upper chamber 111 of the outer tank 110 and the inner tank 120. In addition, the first valve 130 may be rotated about the upper end portion of the inner tank 120 and may expand the refrigerant in the upper chamber 111 of the outer tank 110 into the inner tank 120, may cause the refrigerant therein to flow into the inner tank 120, or may block the flowing of the refrigerant therein into the inner tank 120.

The second valve 140 is arranged in the lower end portion of the inner tank 120 and is positioned between the inner tank 120 and the lower chamber 112 of the outer tank 110. The second valve 140 is rotated about the lower end portion of the inner tank 120. Thus, the refrigerant inside the inner tank 120 can be expanded into the evaporator 300, can be caused to flow into the evaporator 300, or can be blocked from flowing into the evaporator 300.

The actuator 150 is connected to both the first valve 130 and the second valve 140 and rotates a shaft 151 that connects the first valve 130 and the second valve 140 that are arranged to be spaced apart. The actuator 150 may operate in such a manner that the first valve 130 and the second valve 140 are rotated at the same time. The operation of the actuator 150 may be controlled by a controller 600 described below.

That is, the injection-type heat exchange module 100 according to the embodiment of the present disclosure is a module into which the heat exchanger and the flask tank are integrated. Particularly, the injection-type heat exchange module 100 includes the valves that operate by one actuator 150 for adjusting the expanding or flowing of the refrigerant. Accordingly, the effect of simplifying a configuration of the system and improving the efficiency thereof can be achieved.

Particularly, the inner tank 120 may be arranged in such a manner that the heat exchange with the refrigerant inside the upper chamber 111 of the outer tank 110 and the heat exchange with the refrigerant inside the lower chamber 112 thereof possibly takes place at the same time.

That is, the inner tank 120 extends over the upper chamber 111 and the lower chamber 112 of the outer tank 110. One portion of the inner tank 120 may be arranged inside the upper chamber 111, and the other portion thereof may be arranged inside the lower chamber 112.

In addition, the inner tank 120 may be formed to have a structure in which one portion of an external surface thereof or an entire external surface thereof has an enlarged surface area.

An implementation example, the external surface of the inner tank 120 has an enlarged surface area by forming a plurality of dimples or a plurality of grooves therein. Accordingly, the heat exchange with the refrigerants may take place actively inside the outer tank 110.

Particularly, the inner tank 120 may have a structure in which, among the external surfaces of the inner tank 120, a lower surface and upper and lower portions of an outer circumferential surface of the inner tank 120 that are brought into contact with the refrigerant in liquid phase has an enlarged surface area. With this structure, the heat exchange with the refrigerants in liquid phase that are stored in the upper chamber 111 and the lower chamber 112 of the outer tank 110 takes place actively.

The inner tank 120 may be connected at an upper portion thereof to the compressor 200 in such a manner that the refrigerant in gas phase is discharged to the compressor 200, and may be connected at a lower portion thereof to the evaporator 300 in such a manner that the refrigerant in liquid phase is discharged to the evaporator 300 or the lower chamber 112 of the outer tank 110.

That is, the refrigerant in gas phase and the refrigerant in liquid phase are both present inside the inner tank 120. The refrigerant in gas phase that has relatively low specific gravity may be discharged from the upper portion of the inner tank 120 to the compressor 200. The refrigerant in liquid phase that has relatively high specific gravity may be discharged from the lower portion of the inner tank 120 to the evaporator 300 or the lower chamber 112 of the outer tank 110.

In addition, the lower chamber 112 of the outer tank 110 may be connected at an upper portion thereof to the compressor 200 in such a manner that the refrigerant in gas phase is discharged to the compressor 200.

The refrigerant in gas phase and the refrigerant in liquid phase are also both present in the lower chamber 112 of the outer tank 110. The refrigerant in gas phase that has relatively low specific gravity may be discharged from the upper portion of the lower chamber 112 of the outer tank 110 to the compressor 200.

FIG. 3 is a table illustrating open states of the first valve 130 and the second valve 140 according to various control modes of the injection-type heat exchange module 100 according to the embodiment of the present disclosure. FIGS. 4 to 8 are views each illustrating the open states of the first valve 130 and the second valve 140 according to the various control modes of the injection-type heat exchange module 100 according to the embodiment of the present disclosure.

With reference to FIGS. 3 to 8, a rotational expansion hole 131 or a rotational flowing hole 132 is formed in each of the first valve 130 and the second valve 140, and a stationary expansion hole 121 or a stationary flowing hole 122 is formed in each of the upper end portion and the lower end portion of the inner tank 120. Relative rotation of the first valve 130 and the second valve 140 to the inner tank 120 may change a relative position between a rotational expansion hole 141 or a rotational flowing hole 142 and a stationary expansion hole 124 or a stationary flowing hole 123.

As an implementation example, each of the rotational expansion hole 131 and the rotational flowing hole 132 may be provided in the first valve 130, and the rotational expansion hole 131 and the rotational flowing hole 132 may be arranged to be spaced apart by 180 degrees in a circumferential direction of the first valve 130. In addition, a plurality of the stationary flowing holes 122 and a single stationary expansion hole 121 may be formed in the upper end portion of the inner tank 120. A plurality of the stationary flowing hole 122 may be arranged to be spaced apart by 90 degrees along the circumferential direction of the first valve 130. The stationary expansion hole 121 may be arranged to be spaced by 45 degrees along the circumferential direction of the first valve 130 away from any one of the plurality of the stationary flowing holes 122.

In addition, each of the rotational expansion hole 141 and the rotational flowing hole 142 may also be provided in the second valve 140, and the rotational expansion hole 141 and the rotational flowing hole 142 may be arranged to be spaced apart by 180 degrees in a circumferential direction of the second valve 140. In addition, a plurality of the stationary expansion holes 123 and a single stationary flowing hole 124 may be formed in the lower end portion of the inner tank 120. The plurality of the stationary expansion holes 123 may be arranged to be spaced apart by 90 degrees along the circumferential direction of the second valve 140. The stationary flowing hole 124 may be arranged to be spaced by 45 degrees along the circumferential direction of the second valve 140 away from any one of the plurality of the stationary flowing holes 123.

The rotational flowing holes 132 and 142 may be formed in the first valve 130 and the second valve 140, respectively, in such a manner as to have a relatively large opening region. Thus, when the rotational flowing holes 132 and 142 squarely face the stationary flowing holes 122 and 124, respectively, in the upper end portion and the lower end portion of the inner tanks 120, a fluid passes through for bypass without hindrance. In addition, the rotational expansion holes 131 and 141 are formed in the first valve 130 and the second valve 140, respectively, in such a manner to have a relatively small opening region. Although the rotational expansion holes 131 and 141 squarely face the stationary expansion holes 121 and 123, respectively, in the upper end portion and the lower end portion of the inner tank 120, only a relatively small opening region is open. Thus, the fluid can be expanded.

Figure 4:
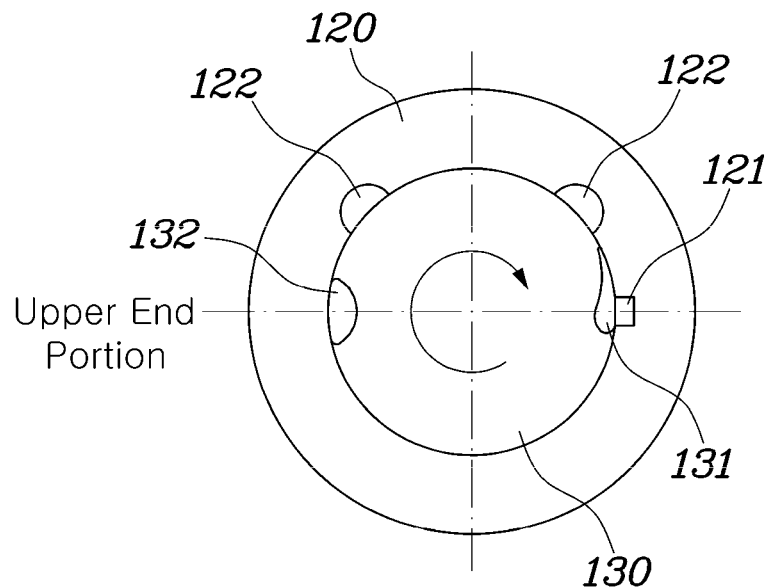
FIGS. 4, 5, 6, 7, and 8 are views each illustrating the open states of the first valve and the second valve according to the various control modes of the injection-type heat exchange module according to the embodiment of the present disclosure.
Figure 4:
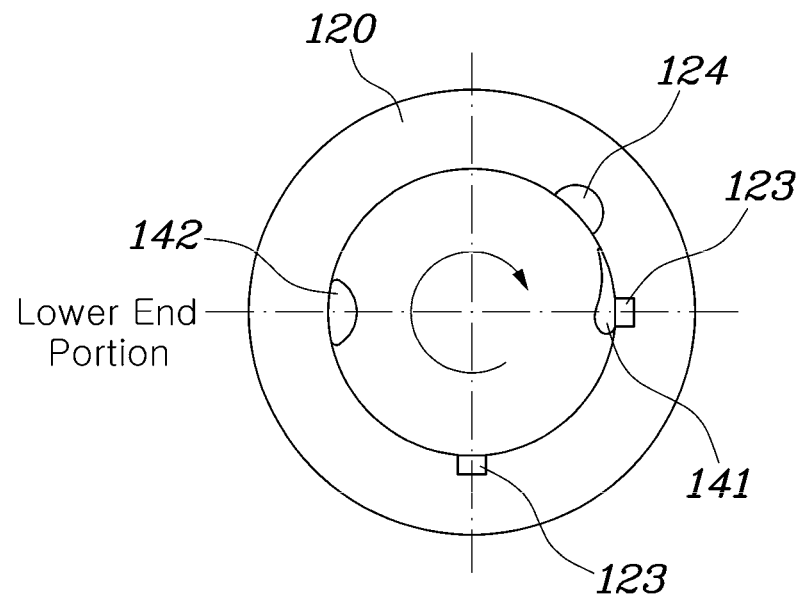

More specifically, as illustrated in Case 1 in FIG. 4, in the gas injection mode, the rotational expansion hole 141 in the second valve 140 may communicate with the stationary expansion hole 123 in the lower end portion of the inner tank 120 at a position where the rotational expansion hole 131 in the first valve 130 communicates with the stationary expansion hole 121 in the upper end portion of the inner tank 120. Accordingly, in the gas injection mode, the refrigerant may be expanded in the stationary expansion hole 121 in the upper end portion of the inner tank 120, and, at the same time, the refrigerant can be expanded in the stationary expansion hole 123 in the lower end portion of the inner tank 120.

Figure 5:
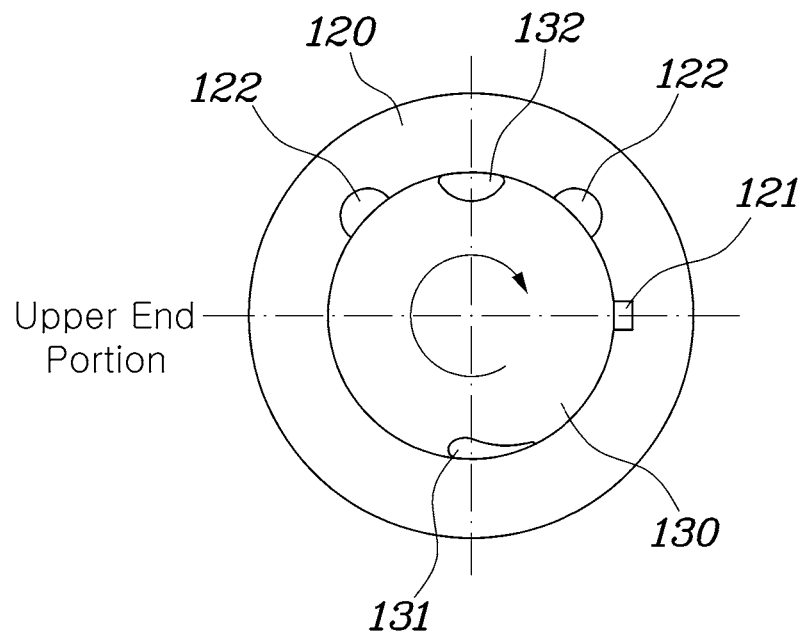
Figure 5:
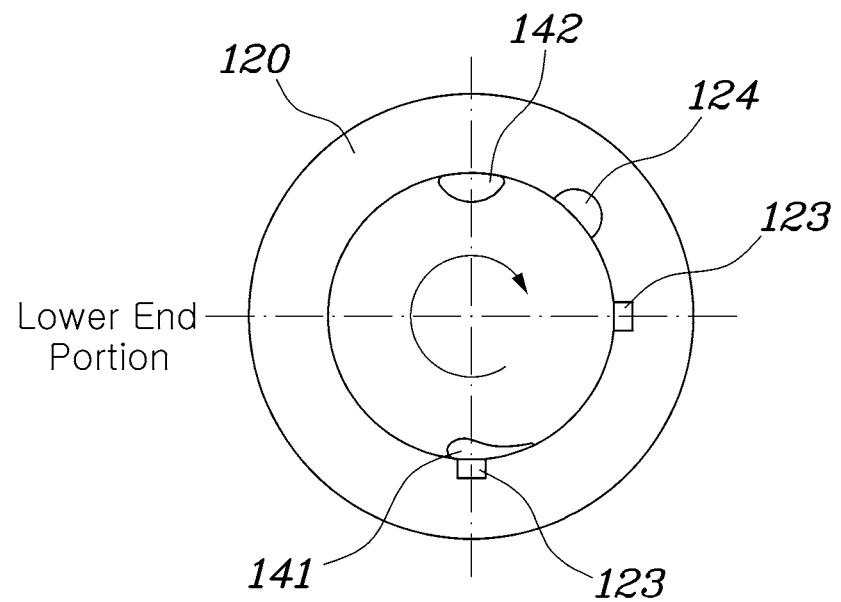

In addition, as illustrated in Case 2 in FIG. 5, in an A/C expansion mode, the rotational expansion hole 131 and the rotational flowing hole 132 in the first valve 130 may be blocked, and the rotational expansion hole 141 in the second valve 140 may communicate with the stationary expansion hole 123 in the lower end portion of the inner tank 120. Accordingly, in the A/C expansion mode, in the upper end portion of the inner tank 120, the refrigerant is blocked from flowing, and, at the same time, the refrigerant may be expanded in the stationary expansion hole 123 in the lower end portion of the inner tank 120.

That is, the rotational expansion hole 131 or the rotational flowing hole 132 in the first valve 130 may be closed at a position where the rotational expansion hole 141 in the second valve 140 communicates with the stationary expansion hole 123 in the lower end portion of the inner tank 120 (Cases 1 and 2). Particularly, the fluid is expanded in the rotational expansion hole 131 in the first valve 130, and thus the rotational flowing hole 132 is closed (Case 1), or the rotational expansion hole 131 and the rotational flowing hole 132 in the first valve 130 may be closed at the same time (Case 2).

Figure 6:
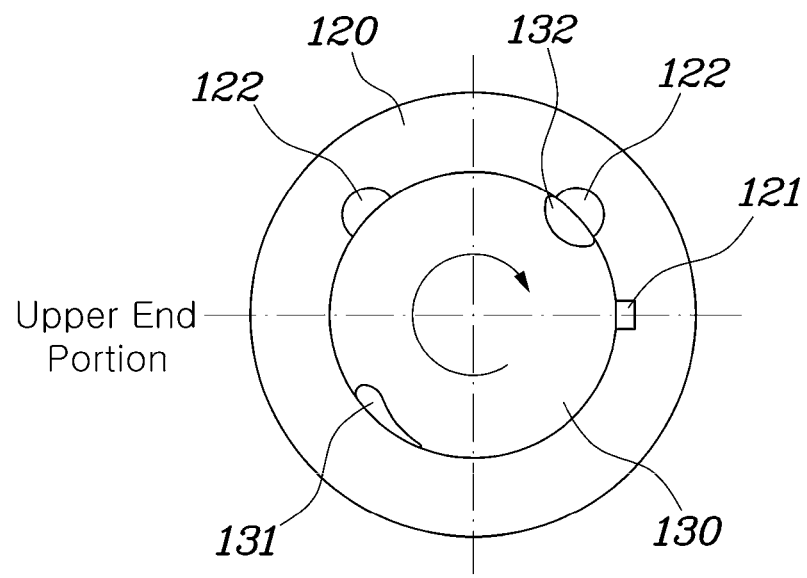
Figure 6:
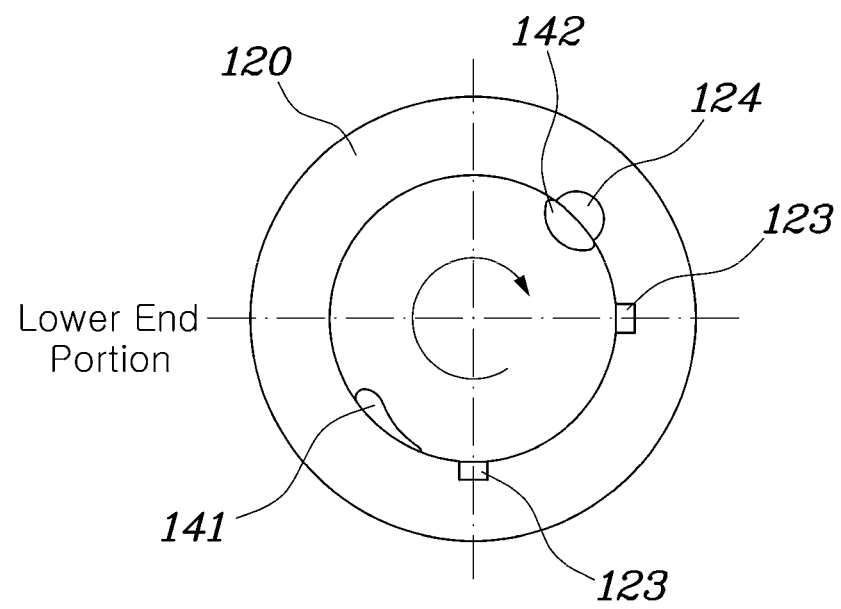

As illustrated in Case 3 in FIG. 6, in a bypass mode, the rotational flowing hole 142 in the second valve 140 may communicate with the stationary flowing hole 124 in the lower end portion of the inner tank 120 at a position where the rotational flowing hole 132 in the first valve 130 communicates with the stationary flowing hole 122 in the upper end portion of the inner tank 120. Accordingly, in the bypass mode, the refrigerant may flow in the stationary flowing hole 124 in the upper end portion of the inner tank 120, and the refrigerant may flow through the stationary flowing hole 124 in the lower end portion of the inner tank 120.

That is, the rotational flowing hole 142 in the second valve 140 may communicate with the stationary flowing hole 124 in the lower end portion of the inner tank 120 at a position where the rotational flowing hole 132 in the first valve 130 communicates with the stationary flowing hole 122 in the upper end portion of the inner tank 120.

Figure 7:
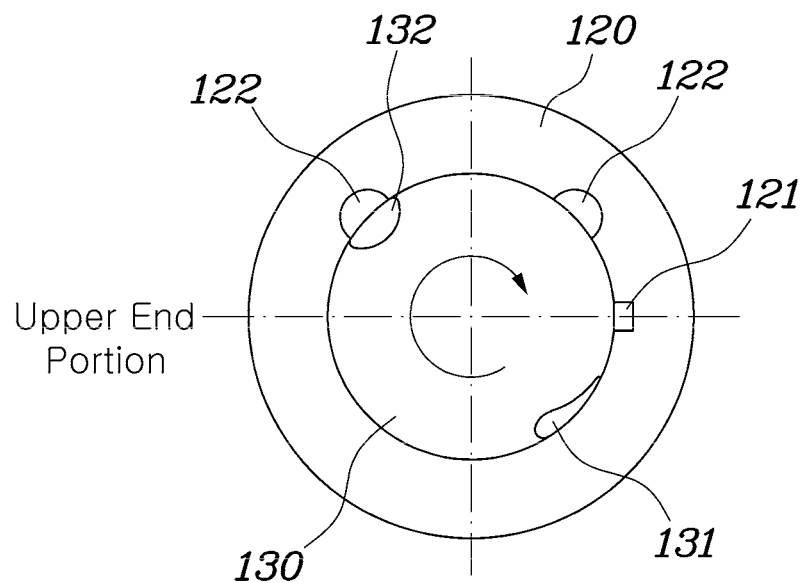
Figure 7:
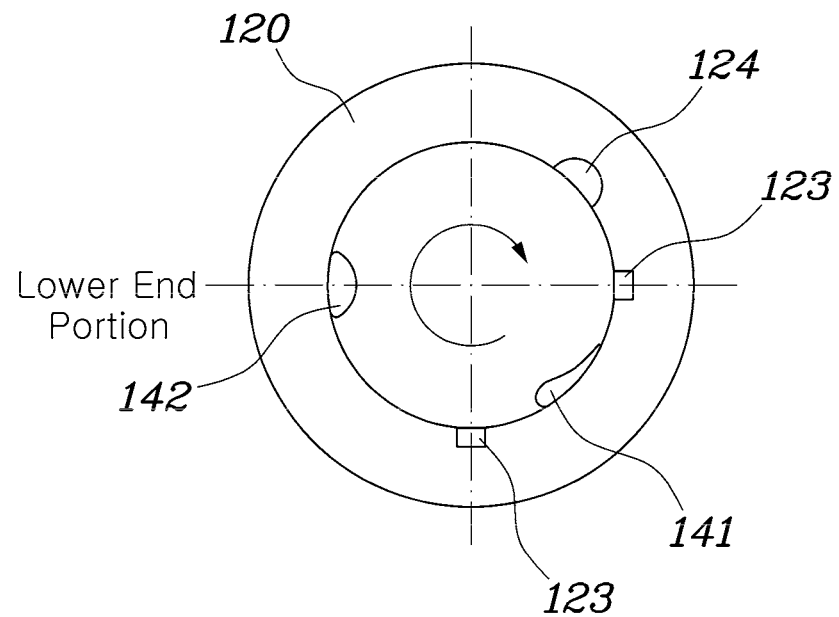

As illustrated in Case 4 in FIG. 7, the rotational flowing hole 142 and the rotational expansion hole 141 in the second valve 140 may be blocked at a position where the rotational flowing hole 132 in the first valve 130 communicates with the stationary flowing hole 122 in the upper end portion of the inner tank 120. Accordingly, in Case 4, the refrigerant can flow in the stationary flowing hole 122 in the upper end portion of the inner tank 120, and, at the same time, the refrigerant may be blocked in the lower end portion of the inner tank 120 from flowing.

That is, the rotational expansion hole 141 or the rotational flowing hole 142 in the second valve 140 may be closed at a position where the rotational flowing hole 132 in the first valve 130 communicate with the stationary flowing hole 122 in the upper end portion of the inner tank 120 (Cases 3 and 4). Particularly, the fluid flows in the rotational flowing hole 132 in the first valve 130, and thus, the fluid flows in the rotational flowing hole 142 in the second valve 140 (Case 3). Alternatively, the fluid flows in the rotational flowing hole 132 in the first valve 130, and thus, the rotational expansion hole 141 and the rotational flowing hole 142 in the second valve 140 may be closed at the same time (Case 4).

Figure 8:
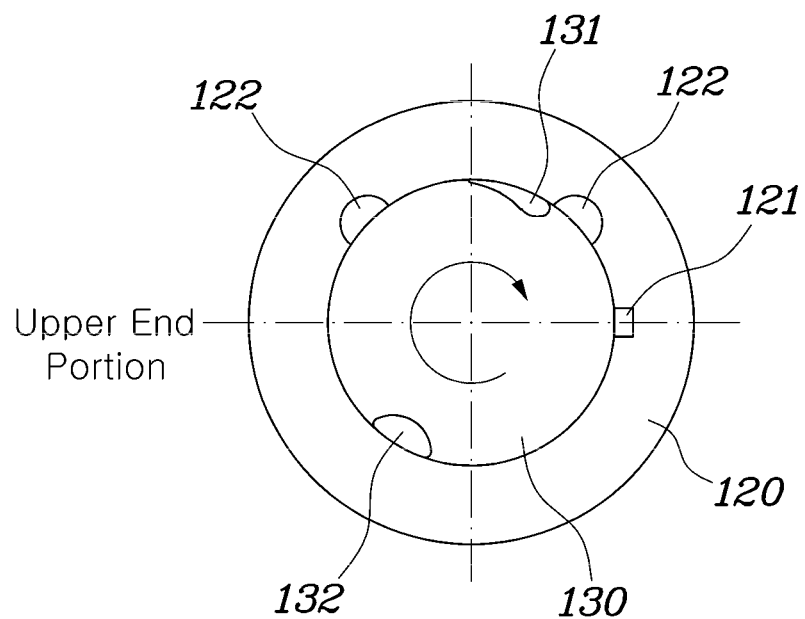
Figure 8:
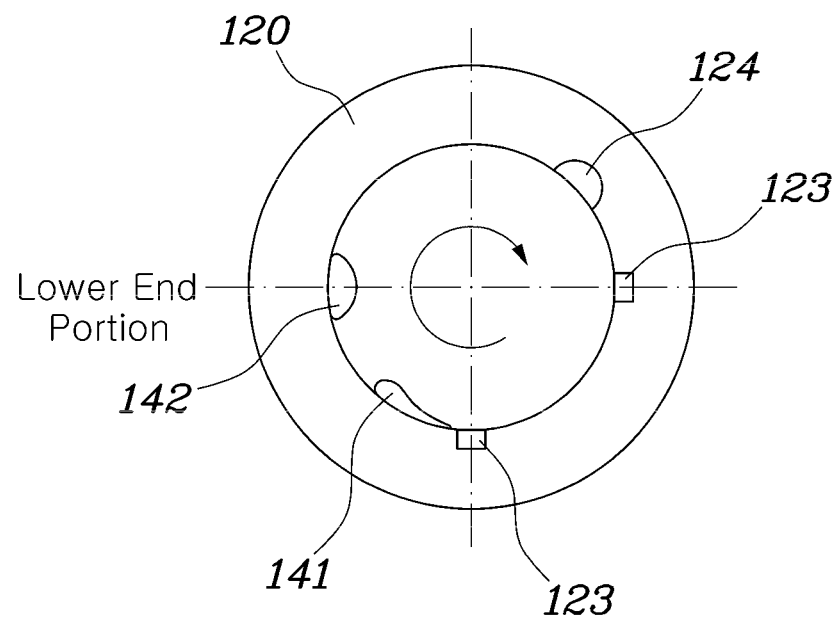

As illustrated in Case 5 in FIG. 8, the rotational flowing hole 142 and the rotational expansion hole 141 in the second valve 140 may be blocked at a position where the rotational flowing hole 132 and the rotational expansion hole 131 in the first valve 130 are blocked. Accordingly, in Case 5, the refrigerant may be blocked in the upper end portion of the inner tank 120 from flowing, and, at the same time, the refrigerant may be blocked in the lower end portion of the inner tank 120 from flowing.

Figure 9:
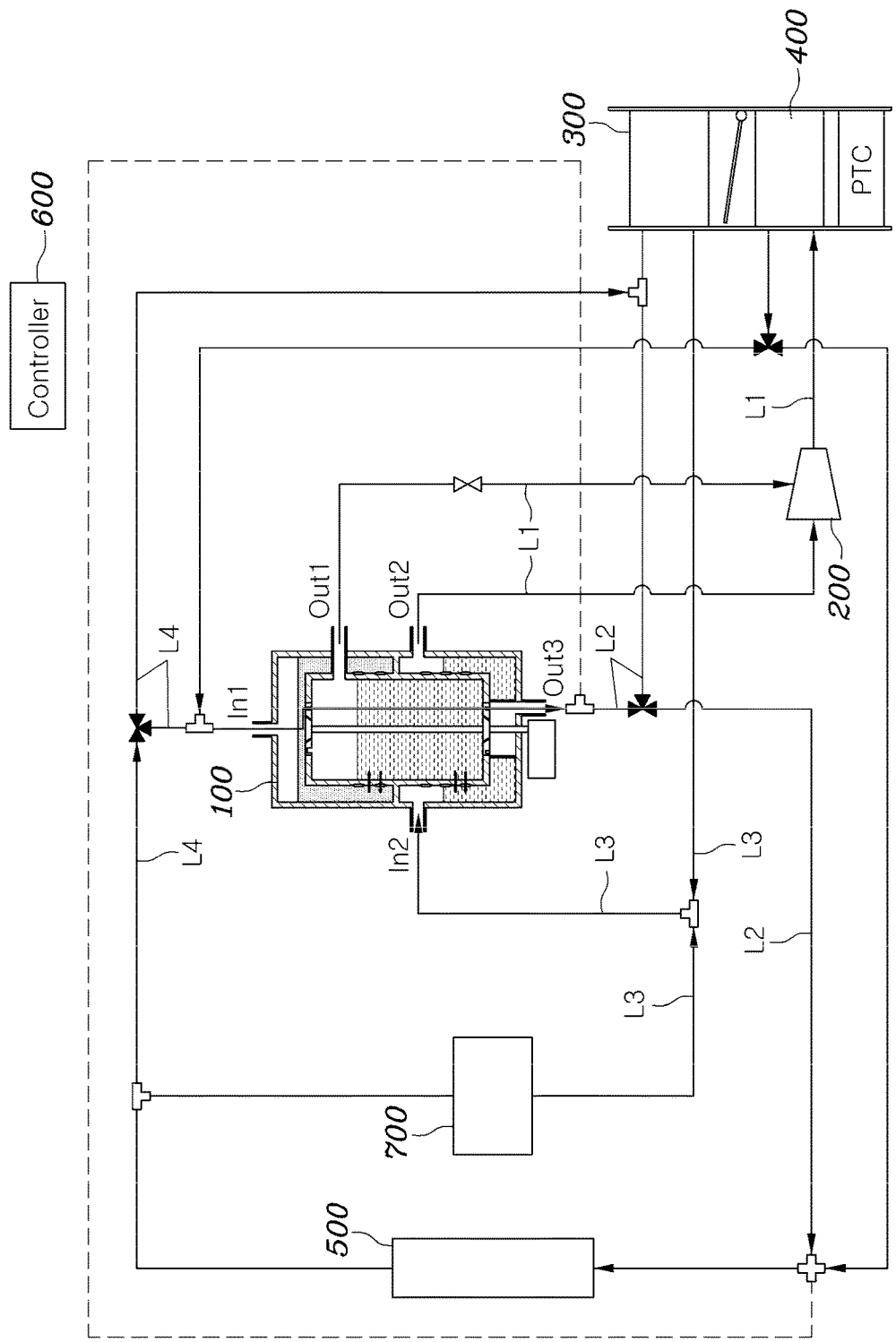
FIG. 9 is a circuit diagram illustrating a thermal management system that uses the injection-type heat exchange module according to the embodiment of the present disclosure.

FIG. 9 is a circuit diagram illustrating a thermal management system that uses the injection-type heat exchange module 100 according to the embodiment of the present disclosure.

With reference to FIG. 9, a vehicle thermal management system in which the injection-type heat exchange module 100 according to the embodiment of the present disclosure includes a first refrigerant line L1, a second refrigerant line L2, a third refrigerant line L3, and a fourth refrigerant line L4. Along the first refrigerant line L1, a refrigerant flows from lower end portions of an inner tank 120 and an outer tank 110 through a compressor 200 to an inner condenser 400. The second refrigerant line L2 branches off from the inner tank 120 to an evaporator 300 and an outer condenser 500 and along which the refrigerant flows. Along the third refrigerant line L3, the refrigerant flows from a chiller or the evaporator 300 to a lower chamber 112 of the outer tank 110. Along the fourth refrigerant line L4, the refrigerant flows from the outer condenser 500 and the inner condenser 400 to an upper chamber 111 of the outer tank 110.

The refrigerants discharged from the inner tank 120 and the outer tank 110 of the injection-type heat exchange module 100 may flow to the compressor 200 along the first refrigerant line L1, and the refrigerant compressed while passing through the compressor 200 may flow to the inner condenser 400 along the first refrigerant line L1.

The second refrigerant line L2 may branch off from the inner tank 120 in such a manner that the refrigerant discharged from the inner tank 120 of the injection-type heat exchange module 100 flows to the evaporator 300 or to the outer condenser 500 along the second refrigerant line L2. A 3-way valve is arranged in a portion of the inner tank 120 from which the second refrigerant line L2 branches off. Thus, a flow direction may be controlled by a controller 600 described below.

The refrigerant may be introduced from the chiller or the evaporator 300 into the lower chamber 112 of the outer tank 110 of the injection-type heat exchange module 100 along the third refrigerant line L3. At this point, the chiller may be an apparatus in which the flowing refrigerant exchanges heat with a coolant that cools an electric component or a battery that is not illustrated.

The refrigerant may be introduced from the outer condenser 500 and the inner condenser 400 into the upper chamber 111 of the outer tank 110 of the injection-type heat exchange module 100 along the fourth refrigerant line L4. The refrigerant discharged from the inner condenser 400 may flow directly to the upper chamber 111 of the outer tank 110 or may flow to the upper chamber 111 of the outer tank 110 through the outer condenser 500. The refrigerant passing through the outer condenser 500 may flow to the upper chamber 111 of the outer tank 110 or to the evaporator 300 along the fourth refrigerant line L4.

The vehicle thermal management system may further include the controller 600 that controls operation of the compressor 200 and controls rotation of the actuator 150 in such a manner that a first valve 130 and a second valve 140 expand the refrigerant, cause the refrigerant to flow, or block the flowing of the refrigerant.

The controller 600 according to the exemplary embodiment of the present disclosure may be realized by a nonvolatile memory (not illustrated) and a processor (not illustrated). The nonvolatile memory is configured to store data associated with an algorithm written in such a manner to control operation of each of various constituent components of the vehicle or with a software command for executing the algorithm. The processor is configured to perform an operation described below using the data stored in the memory. The memory and the processor here may be realized as individual chips, respectively. Alternatively, the memory and the processor may be realized as a single integrated chip. The processor may be configured as a single processor or a plurality of processors.

The controller 600 may control the actuator 150 in such a manner that the first valve 130 and the second valve 140 are rotated at the same time. Additionally, the controller 600 may control the 3-way valve provided on the refrigerant line in the vehicle thermal management system and thus may control the direction of the flow of the refrigerant along the refrigerant.

Figure 10:
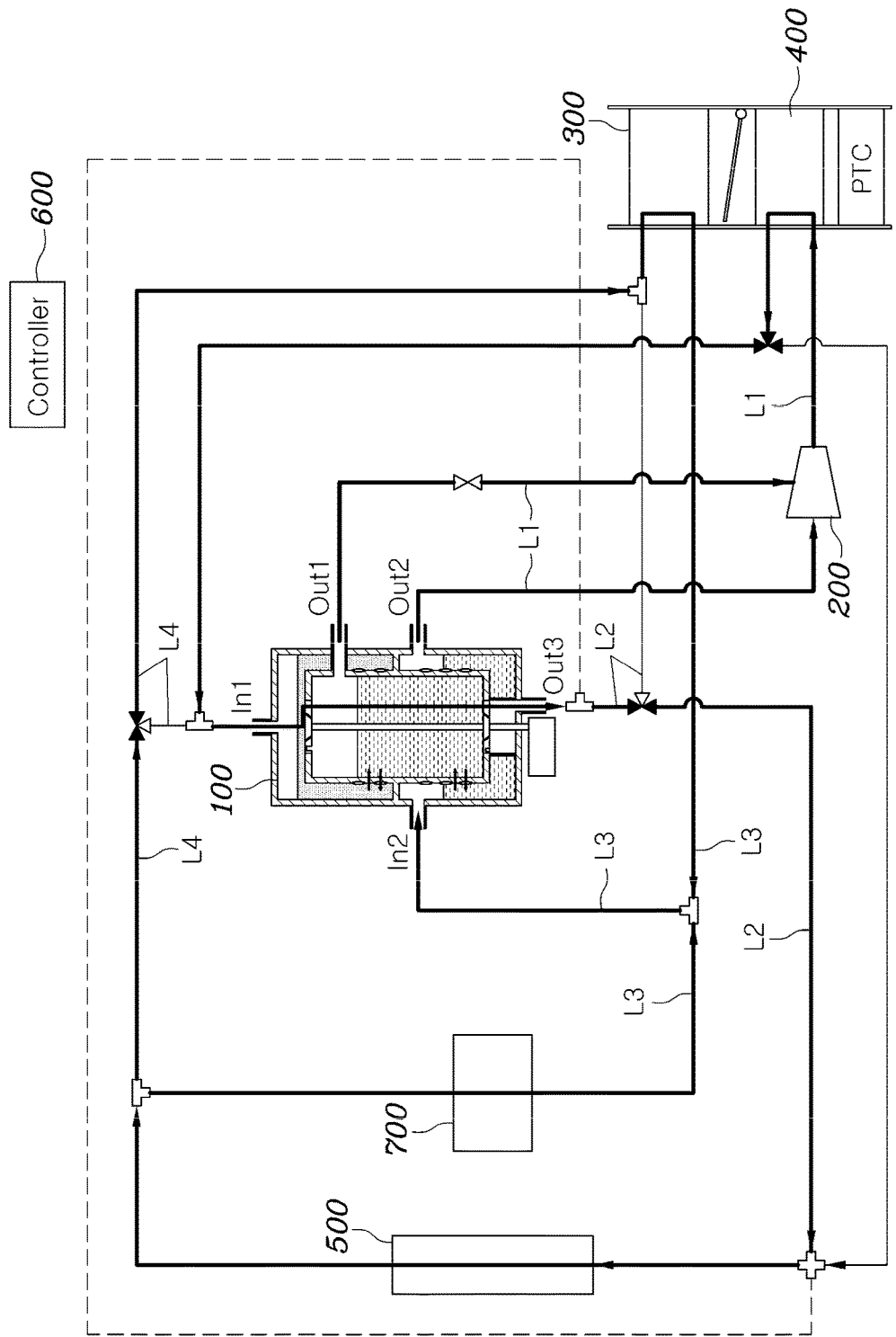
FIG. 10 is a circuit diagram illustrating an operating mode of the vehicle thermal management system that uses the injection-type heat exchange module according to the embodiment of the present disclosure.

FIG. 10 is a circuit diagram illustrating an operating mode of the vehicle thermal management system that uses the injection-type heat exchange module 100 according to the embodiment of the present disclosure.

With reference to FIG. 10, the controller 600 may control the actuator 15 in such a manner that, in the gas injection mode, the first valve 130 expands the refrigerant in the upper chamber 111 of the outer tank 110 into the inner tank 120 and that the second valve 140 expands the refrigerant inside the inner tank 120 into the evaporator 300 through a cooling hole communicating with the evaporator 300.

That is, in the gas injection mode, the refrigerant may be expanded in the stationary hole in the upper end portion of the inner tank 120 through the first valve 130. At the same time, the refrigerant may be expanded in the cooling hole in the lower end portion of the inner tank 120 through the second valve 140.

The specific embodiment of the present disclosure is described above with every feature thereof being illustrated in the drawings, and it would be obvious to a person of ordinary skill in the art that various modifications and alterations are possibly made to the present disclosure without departing from the technical idea of the present disclosure that is claimed in the following claims.

The invention claimed is:

1. A heat exchange module comprising:
   an outer tank comprising an upper chamber and a lower chamber that are separated from each other, the upper chamber being configured to allow a refrigerant to be introduced from an outer condenser or an inner condenser, and the lower chamber being configured to allow the refrigerant to be introduced from an evaporator and to discharge the refrigerant to a compressor;
   an inner tank arranged inside the outer tank so that heat exchange with the refrigerant inside the outer tank can take place, and connected to discharge the refrigerant to the compressor or the evaporator;
   a first valve arranged in an upper end portion of the inner tank, the first valve being configured to rotate to expand the refrigerant in an upper portion of the outer tank into the inner tank, causing the refrigerant in the upper portion to flow into the inner tank, or blocking the flowing of the refrigerant in the upper portion into the inner tank;
   a second valve arranged in a lower end portion of the inner tank, the second valve being configured to rotate to expand the refrigerant inside the inner tank into the evaporator, causing the refrigerant inside the inner tank to flow into the evaporator, or blocking the flowing of the refrigerant inside the inner tank into the evaporator; and
   an actuator connected to both the first valve and the second valve, the actuator being configured to rotate the first valve and the second valve at the same time.

2. The heat exchange module of claim 1, wherein the inner tank is arranged such that heat exchange with a first portion of the refrigerant in the upper chamber and a second portion of the refrigerant in the lower chamber can take place at the same time.

3. The heat exchange module of claim 1, wherein the inner tank has an external surface, wherein at least a portion of the external surface has an enlarged surface area.

4. The heat exchange module of claim 1, wherein an upper portion of the inner tank is connected to the compressor such that the refrigerant in a gas phase is discharged to the compressor, and a lower portion of the inner tank is connected to the evaporator such that the refrigerant in a liquid phase is discharged to the evaporator.

5. The heat exchange module of claim 1, wherein an upper portion of the lower chamber of the outer tank is connected to the compressor such that the refrigerant in a gas phase is discharged to the compressor.

6. The heat exchange module of claim 1, wherein a rotational expansion hole or a rotational flowing hole is formed in each of the first valve and the second valve;
   a stationary expansion hole or a stationary flowing hole is formed in each of the upper end portion and the lower end portion of the inner tank; and
   relative rotation of the first valve and the second valve to the inner tank changes a relative position between the rotational expansion hole or the rotational flowing hole and the stationary expansion hole or the stationary flowing hole.

7. The heat exchange module of claim 6, wherein the rotational expansion hole in the second valve communicates with the stationary expansion hole in the lower end portion of the inner tank at a position where the rotational expansion hole in the first valve communicates with the stationary expansion hole in the upper end portion of the inner tank.

8. The heat exchange module of claim 6, wherein the rotational expansion hole or the rotational flowing hole in the first valve is closed at a position where the rotational expansion hole in the second valve communicates with the stationary expansion hole in the lower end portion of the inner tank.

9. The heat exchange module of claim 6, wherein the rotational flowing hole in the second valve communicates with the stationary flowing hole in the lower end portion of the inner tank at a position where the rotational flowing hole in the first valve communicates with the stationary flowing hole in the upper end portion of the inner tank.

10. The heat exchange module of claim 6, wherein the rotational expansion hole or the rotational flowing hole in the second valve is closed at a position where the rotational flowing hole in the first valve communicates with the stationary flowing hole in the upper end portion of the inner tank.

11. A vehicle thermal management system using the heat exchange module of claim 1, the system comprising:
    a first refrigerant line along which refrigerant flows from lower end portions of the inner tank and the outer tank through a compressor to an inner condenser;
    a second refrigerant line branching off from the inner tank to an evaporator and an outer condenser, the refrigerant flowing along the second refrigerant line;
    a third refrigerant line along which the refrigerant flows from a chiller or the evaporator to a lower chamber of the outer tank; and
    a fourth refrigerant line along which the refrigerant flows from the outer condenser and the inner condenser to an upper chamber of the outer tank.

12. The vehicle thermal management system of claim 11, further comprising:
    a controller configured to control operation of the compressor and to control rotation of the actuator such that the first valve and the second valve expand the refrigerant, causing the refrigerant to flow, or block the flow of the refrigerant.

* * * * *